(12) United States Patent
Finnäs et al.

(10) Patent No.: US 11,638,977 B2
(45) Date of Patent: May 2, 2023

(54) SPINDLE BEARING COOLING ARRANGEMENT IN AN ABRADING APPARATUS

(71) Applicant: Mirka Ltd, Jepua (FI)

(72) Inventors: Stig Finnäs, Sundby (FI); Caj Nordström, Jeppo (FI); Simon Bäck, Vörå (FI)

(73) Assignee: MIRKA LTD., Jepua (FI)

( * ) Notice: Subject to any disclaimer, the term of this patent is extended or adjusted under 35 U.S.C. 154(b) by 435 days.

(21) Appl. No.: 16/638,153

(22) PCT Filed: Aug. 30, 2018

(86) PCT No.: PCT/FI2018/050611
§ 371 (c)(1),
(2) Date: Feb. 11, 2020

(87) PCT Pub. No.: WO2019/043293
PCT Pub. Date: Mar. 7, 2019

(65) Prior Publication Data
US 2020/0361051 A1    Nov. 19, 2020

(30) Foreign Application Priority Data

Sep. 1, 2017 (FI) ...................................... 20175787

(51) Int. Cl.
*B24B 23/02* (2006.01)
*B24B 55/02* (2006.01)
*F16C 37/00* (2006.01)

(52) U.S. Cl.
CPC .............. *B24B 23/02* (2013.01); *B24B 55/02* (2013.01); *F16C 37/007* (2013.01)

(58) Field of Classification Search
CPC ....... B24B 23/03; B24B 23/026; B24B 23/00; B24B 23/02; B24B 23/04; B24B 41/007;
(Continued)

(56) References Cited

U.S. PATENT DOCUMENTS 8,303,380 B2 * 11/2012 Lehman ................ B24B 55/045
451/442
9,028,300 B2 * 5/2015 Ahn ........................ B24D 7/10
451/488

FOREIGN PATENT DOCUMENTS

CN    201291390 Y    8/2009
CN    102712072 A  * 10/2012 ........... B24B 23/026
(Continued)

OTHER PUBLICATIONS

EPO, Extended European Search Report dated Nov. 30, 3031 issued in corresponding European Patent Application No. 18851470.7.
(Continued)

*Primary Examiner* — Joseph J Hail
*Assistant Examiner* — Arman Milanian
(74) *Attorney, Agent, or Firm* — ArentFox Schiff LLP

(57) ABSTRACT

An arrangement for cooling a spindle bearing or bearings of an abrading apparatus with rotating abrading members is disclosed. This is premised on arranging in a housing of the abrading apparatus conduits which extend from a spindle bearing chamber wall of the housing to an inner suction chamber wall of the housing. Via such conduits, hot air may be expelled from a spindle bearing chamber of the housing as an overpressure in front of a protruding balancer element of a rotating shaft balancer is discharged from the spindle bearing chamber via a conduit into a suction chamber. Cool air may be conveyed from a suction chamber into the spindle bearing chamber as an underpressure behind the protruding balancer element draws in air from the suction chamber via the conduit to the spindle bearing chamber.

15 Claims, 12 Drawing Sheets

(58) Field of Classification Search
CPC ....... B24B 55/00; B24B 55/02; B24B 55/045; B24B 55/10; B24B 55/105; B24B 55/102; B24B 55/06; B24B 55/05; B24B 55/055; B25F 5/008; F16C 37/007
USPC ....... 451/357, 359, 344, 456, 270, 271, 353, 451/451
See application file for complete search history.

(56) References Cited

FOREIGN PATENT DOCUMENTS

| CN | 104662316 | A | 5/2015 | |
|---|---|---|---|---|
| CN | 205888726 | U | 1/2017 | |
| EP | 1586416 | A2 * | 10/2005 | ............. B24B 23/03 |
| EP | 1586416 | A2 | 10/2005 | |
| JP | H9-317778 | A | 12/1997 | |
| KR | 20150011603 | A | 2/2015 | |
| TW | M333983 | U | 6/2008 | |
| WO | 03051574 | A1 | 6/2003 | |

OTHER PUBLICATIONS

TW, Search Report dated Nov. 19, 2021 issued in corresponding Taiwanese Patent Application No. 107130682.

* cited by examiner

SPINDLE BEARING COOLING ARRANGEMENT IN AN ABRADING APPARATUS

PRIORITY

This application is a U.S. national application of the international application number PCT/FI2018/050611 filed on Aug. 30, 2018 and claiming priority of Finnish application 20175787 filed on Sep. 1, 2017 the contents of all of which are incorporated herein by reference.

FIELD

The solution relates to abrading apparatuses with rotating abrading members such as disc and orbital sanders, particularly as intended for non-stationary operation as operated by a user. Such abrading apparatuses typically are powered by an electric or a pneumatic motor for bringing about the orbital motion of the abrading member, and are useful in treating the surfaces of workpieces by means of abrading.

BACKGROUND

Abrading apparatuses with rotating abrading members, such as orbital sanders, typically have a construction wherein an electric or a pneumatic motor is employed to bring about a rotary motion on a shaft attached to the motor. The rotating abrading member or members are, in turn, typically attached to a spindle which in turn is attached to the shaft. The construction comprising the spindle and the shaft may additionally comprise components adapted for balancing the rotating construction.

The rotating abrading members comprise an abrading article comprising abrading particles. In addition, such rotating abrading members may comprise, for example, a backing pad. In addition, such rotating abrading members may comprise, for example an interface pad arranged between the abrading article and the backing pad.

Abrading apparatuses with rotating abrading members, like other types of abrading apparatuses, may comprise or be attached to a source of suction pressure for extracting abrading debris from the workpiece being abraded and for expelling the abrading debris to outside the abrading apparatus, for example into a debris collection receptacle.

In orbital abrading apparatuses, including random orbital abrading apparatuses, the center of the spindle is offset from that of the shaft driven by the motor. Therefore, the spindle is made to travel in a circular path around the center of the shaft when the shaft is driven by the motor. Consequently, the abrading members may be arranged to move in an orbital pattern.

Typically, particularly in random orbital abrading apparatuses, the spindle is attached to the shaft via a bearing or bearings such that the spindle may rotate freely relative to the rotating of the shaft. Consequently, in addition to travelling in a circular path around the center of the shaft, the spindle may additionally rotate such that the rate of rotation of the spindle may differ from that of the shaft.

During rotating of the spindle relative to the shaft, the temperature of the spindle bearing(s) typically increases. This is due to, for example, the bearing elements, such as bearing balls or cylinders frictiously moving against the surfaces of the outer and/or the inner ring (or the "raceways") of the bearing, and/or the fluid friction of the lubricant within the bearing as a result of the movement of the bearing elements in the midst of the lubricant. In addition, the temperature of the spindle bearing(s) may increase due to heat elsewhere from the apparatus being conducted to the bearing such as from the motor via the shaft and other possible components of the apparatus enabling the coupling between the spindle and the shaft.

In the interest of achieving a service free and simple construction, such spindle bearing(s) are typically pre-greased. This means that the lubricant required in the bearing(s) is inserted into the bearing during manufacturing, and the finished bearing constitutes a sealed enclosure such that subsequent lubrication by the user is not intended and/or practical and/or possible.

Increase in the temperature of the spindle bearing(s) is generally undesirable. This is because in elevated temperatures, such as more than 110° C. or more than 120° C., which represent typical maximum operating temperatures for ball bearings as specified by their manufacturers, commonly used pre-grease lubricants tend to cook or leak out from the bearing enclosure due to heat-induced drop in viscosity (i.e. thinning) and consequently escape from the bearing enclosure. This, in turn, leads to increased heat generation in the bearing during use due to decreased lubrication, risking bearing failure or even the failure of the entire apparatus as a result.

Increase in the temperature of the spindle bearing(s) is generally undesirable also because the heat generated in the bearing tends to dissipate to elsewhere in the apparatus, such as to the motor via the spindle and/or the shaft. And as is known in the industry, increase in the operating temperature of a motor, such as an electric motor, reduces the maximum output of the motor, reduces the useful life of the motor and creates an elevated risk of premature failure.

In the industry, there is a tendency to make abrading apparatuses with smaller bodies in the interest, for example, improved handling, lower weight and reduced consumption of materials of manufacturing. This means that there is increasingly less room for heat from the spindle bearing to dissipate to and less material to absorb such heat. Simultaneously, there is often a desire to run more power through the spindle and the spindle bearing(s) in the interest, for example, to facilitate the use of larger abrading articles and/or more aggressive abrading (i.e. increase the rate of material removal from the workpiece, requiring increased abrading power) and/or higher rotational rates to which the spindle bearing(s) are subjected to, which tend to increase the heat generated in and/or conveyed to the spindle bearing(s).

Therefore, effective cooling of the spindle bearing(s) in abrading apparatuses with rotating abrading members is desirable and called for in the industry.

The cooling of the spindle bearing(s) is particularly problematic in abrading apparatuses in which there are more than one abrading debris suction conduits in the housing providing housing for the rotating abrading members. Especially when such more than one suction conduits are placed at significant circumferential distance apart from each other, such as two suction conduits at the opposite sides of the housing, cooling of the spindle bearing(s) is poor because air flows originating from the surroundings of the abrading apparatus tend to be conveyed to the suction conduits without contacting the spindle bearings.

SUMMARY OF THE DISCLOSED SOLUTION

The disclosed solution is premised on increasing heat dissipation to the surrounding environment from a spindle bearing of an abrading apparatus by means of facilitating the conveyance of (1) cool air from the surrounding environment to the immediate vicinity to the spindle bearing and (2) hot air from the immediate vicinity of the spindle bearing to the surrounding environment. According to the disclosed solution, such conveyance of air is facilitated by air conveyance conduits in the housing surrounding the spindle and spindle bearing assembly.

The disclosed solution may be particularly beneficial in abrading apparatuses equipped with more than one abrading debris suction conduits with substantial circumferential distance from each other. In such abrading apparatuses, the air in the immediate vicinity of the spindle bearing tends to be subject to poor circulation. In other words, in such abrading apparatuses, air tends to become to a large degree trapped in the immediate vicinity of the spindle bearing, leading to poor cooling of the spindle bearing. This is because air originating from the surrounding environment of the abrading apparatus tends to be conveyed to the nearest suction conduit without travelling via the immediate vicinity of the spindle bearing.

Having more than one abrading debris suction conduits may be advantageous in abrading apparatuses with rotating abrading members with large diameters. This is because, for example, suction efficiency may deteriorate with as a function of distance since suction-induced debris extraction is most efficient near a suction conduit. Examples of such large-diameter abrading apparatuses include wall and ceiling sanders.

According to the solution, the movement of air to and from the immediate vicinity of the spindle bearing via the conduits may be effected by a shaft balancer, in which case there is no need for components for the express purpose of effecting such movement of air. In other words, according to the solution, a shaft balancer may function in a manner similar to a fan blade.

The disclosed solution enables the introduction of cool air into the immediate vicinity of the spindle bearing and the evacuation hot air from the immediate vicinity of the spindle bearing without a need of a separate fan arranged to air-cool the spindle bearing. Therefore, the disclosed solution provides a simpler, more compact, more maintenance-free, more reliable and more easily manufactured means of arranging cooling than with a separate fan such as an electric fan comprising e.g. an electric motor of its own or a separate set of fan blades arranged around the spindle bearing or an assembly comprising the spindle bearing.

The disclosed solution enables the introduction of cool air into the immediate vicinity of the spindle bearing and the evacuation hot air from the immediate vicinity of the spindle bearing without a need of an oil cooling system premised on circulating oil through the spindle bearing. Therefore, the disclosed solution provides a simpler, more compact, more maintenance-free, more reliable and more easily manufactured means of arranging cooling than with an oil cooling which requires, for example, means for arranging oil circulation.

The disclosed solution enables the running of the spindle bearing in reduced temperatures as a result of enhanced air cooling brought about air conduits conveying air to and from the immediate vicinity of the spindle bearing. Hence, the solution enables increased life span for the spindle bearing as well as other parts of the abrading apparatus susceptible to heat-induced increase in failure rates, such as an electric motor in electrically powered abrading apparatuses.

The reduced temperature of the spindle bearing also enables the use of pre-greased spindle bearings with high loads and/or rotational rates without a need to resort in arranging lubrication with a circulating oil system requiring additional system components.

The disclosed solution may comprise an abrading apparatus suitable for abrading a workpiece with a rotating abrading member or members, the abrading apparatus comprising a rotating shaft balancer adapted for balancing the rotating motion of the rotating abrading member or members, the shaft balancer comprising a protruding balancing element; a spindle attached to the shaft balancer via a spindle bearing to which spindle the rotating abrading member or members are releasably attached with a fixing or fixings; and a housing adapted to prevent abrading debris from spreading to the surrounding environment. Such a housing may comprise as recessed spaces a spindle bearing chamber which may house at least part of the balancing element of the shaft balancer, and which spindle bearing chamber is defined by a spindle bearing chamber wall; and at least one suction chamber defined by an inner suction chamber wall and an outer suction chamber wall, the suction chamber adapted to controllably collect and extract abrading debris, and which housing has a clearance between the rotating abrading members and the housing. The housing may further comprise at least two conduits extending from the spindle chamber wall to the inner suction chamber wall, the conduits adapted for cooling the spindle bearing by conveying air between the spindle bearing chamber and the suction chamber.

The disclosed solution may comprise a method for cooling a spindle bearing of an abrading apparatus wherein the shaft balancer of the abrading apparatus is rotated within the spindle bearing chamber such that an overpressure is formed in front of the protruding balancer element of the rotating shaft balancer with respect to the rotational direction of the shaft balancer and an underpressure is formed behind the protruding balancer element of the rotating shaft balancer with respect to the rotational direction of the shaft balancer. Thereby air heated by the spindle bearing may be conveyed from the spindle bearing chamber to the suction chamber as the overpressure in front of the protruding balancer element of the rotating shaft balancer is discharged from the spindle bearing chamber via a conduit into the suction chamber, and cool air may be conveyed from the suction chamber into the spindle bearing chamber as an underpressure behind the protruding balancer element of the rotating shaft balancer draws in air from the suction chamber via a conduit to the spindle bearing chamber.

The figures are schematic and intended to illustrate the general idea of the disclosed solution. Therefore, the figures are not in precise scale and/or exhaustive in terms of possible embodiments of the disclosed solution.

DETAILED DESCRIPTION OF THE INVENTION

Figure 1:
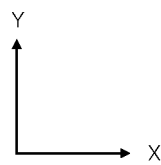
FIG. 1 schematically illustrates a cross section of a conventional random orbital abrading apparatus, as depicted without the body of the abrading apparatus comprising a motor.
Figure 1:
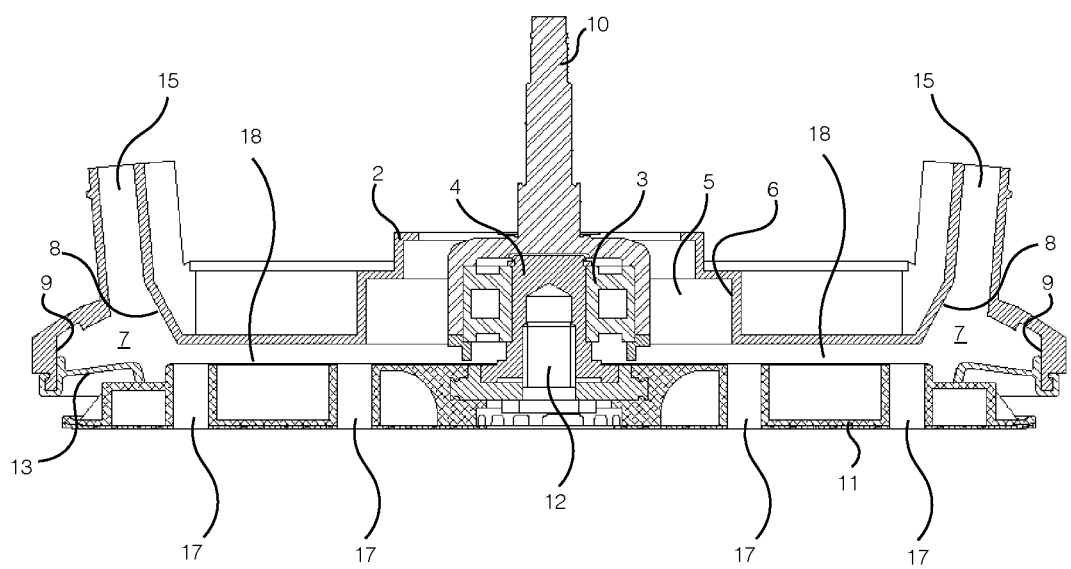

In the text, reference is made to the figures with the following numerals and denotations:
1 Conduit
2 Housing
3 Spindle bearing
4 Spindle
5 Spindle bearing chamber
6 Spindle bearing chamber wall
7 Suction chamber
8 Inner suction chamber wall
9 Outer suction chamber wall
10 Shaft balancer
11 Backing pad
12 Fixing
13 Seal
14 Spindle fan blade
15 Suction conduit
16 Balancing element
17 Abrading debris extraction conduit
18 Clearance
19 Outer wall of the balancing element
20 Main body of the shaft balancer
O Overpressure
U Underpressure
X, Y, Z Orthogonal coordinate directions Referring to FIG. 1, in a typical orbital abrading apparatus, such as a random orbital abrading apparatus, a motor (not depicted), such as an electric motor, is coupled with a shaft. Such a shaft may be a shaft balancer 10 which incorporates a balancing element 16 in the shaft.

The shaft balancer 10 may be coupled with the motor by, for example, attaching the shaft balancer 10 to the shaft of the motor, or to the rotor of an electric motor. Thus, the rotary motion produced by the motor may be used to rotate the shaft balancer 10.

Henceforth, in the interest of conciseness of expression and consistency with the Figures, reference is made to a shaft balancer 10 as the shaft coupled with the motor with an understanding that the aforementioned alternative implementations are possible as well.

To bring about an orbital movement of the abrading member or members, the axis of rotation of the spindle 4 is arranged eccentrically relative to axis of rotation of the shaft balancer 10. This will make the center of mass of the spindle 4, the spindle bearing 3 and the abrading member or members to rotate eccentrically relative to the axis of rotation of the shaft balancer 10, resulting in rotational unbalance and vibrations. Therefore, a balancing element 16 may be placed opposite to the eccentrically placed spindle 4, thereby creating an opposite force compared to the force from the eccentric rotation as just explained. With this method, static vibrations are reduced. Further dynamic balancing elements (not depicted) may be arranged to compensate the height difference along the Y axis of the balancing element 16 and weight point of the spindle 4, spindle bearing 3 and abrading member or members. The dynamic balancing elements may be arranged in the motor (not depicted) together with an increased balancing element 16.

Figure 9A:
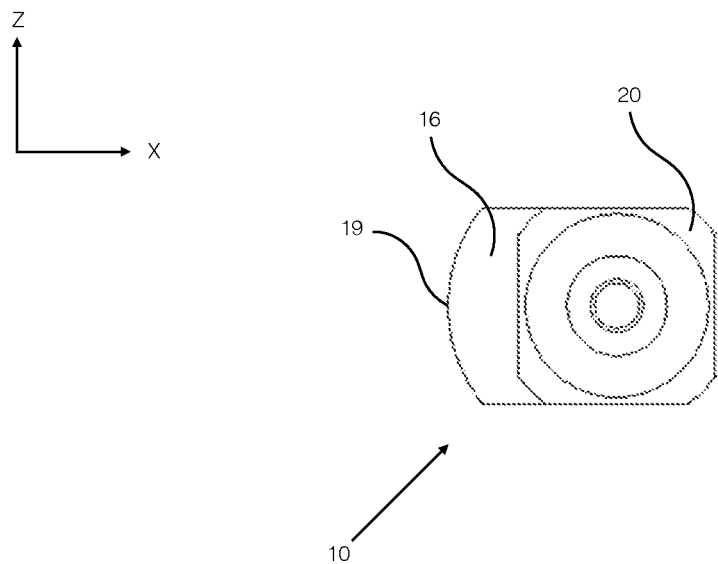
FIG. 9a illustrates a shaft balancer with a balancing element, as viewed from below.
Figure 9B:
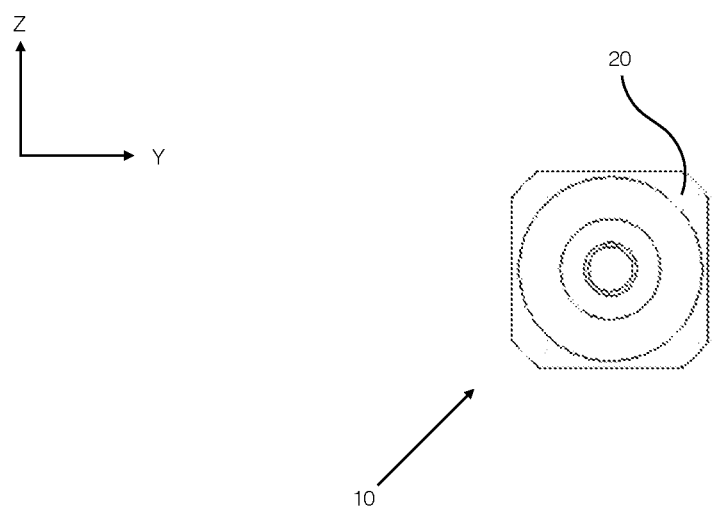
FIG. 9b illustrates a shaft balancer without a balancing element, as viewed from below.

As illustrated in FIG. 9a, the shaft balancer 10 may bring about the balancing function by way of being asymmetrical in terms of its weight distribution with respect to its axis of rotation. Typically, such weight asymmetry is brought about by dimensional asymmetry, especially if the shaft balancer 10 is substantially uniform with respect to its material composition. As illustrated in FIG. 9a, such dimensional asymmetry may take the form of an outward protrusion with respect to the axis of rotation of the shaft balancer 10, in which case the outward protrusion serves as the balancing element 16. Consistent with FIG. 9a, in which the shaft balancer 10 is illustrated according to one example embodiment as viewed from the below, i.e. on the Z-X plane, the outward protrusion refers to the balancing element 16 which extends radially outward such that the outer wall of the balancing element 19 extends farther from the axis of rotation of the shaft balancer 10 than the main body 20 of the shaft balancer 10. For comparative clarity, FIG. 9b illustrates the same embodiment of the shaft balancer 10 without the outward protrusion, i.e. without the balancing element 16, i.e. where the main body 20 of the shaft balancer defines the circumference of the shaft balancer 10 on the Z-X plane.

The balancing element may be a protruding aspect of the shaft balancer 10. Or, the balancing element may be a separate balance element attached to the shaft balancer 10. Or, the balancing element may combine both of these alternatives wherein, for example, the separate balance element may be adjustably attached to the protruding aspect of the shaft balancer 10 for the purpose of adjusting the weight asymmetry of the shaft balancer 10.

Referring back to FIG. 1, in an orbital abrading apparatus, such as a random orbital abrading apparatus, there typically is a spindle 4 adapted to receive rotary abrading members. Such rotary abrading members may comprise an abrading article (not depicted) comprising abrading particles. Additionally, such rotary abrading members may comprise a backing pad 11. Still additionally, such rotary abrading members may comprise an interface pad (not depicted).

In a typical configuration, rotary abrading members may comprise a backing pad 11 attached by means of a fixing 12 such as a bolt or a screw to the spindle 4, and an abrading article may be attached to the backing pad 11. In another typical configuration, the abrading article may be attached to an interface pad, the interface pad may be attached to the backing pad 11, and the backing pad 11 may be attached to the spindle 4. The attachments between the backing pad 11 and the abrading article, the backing pad 11 and the interface pad, and the abrading article and the interface pad may be brought about, for example, by means of a hook-and-loop type of an attachment mechanism. It may be possible to attach an abrading article by means of a fixing 12 to the spindle 4 without a backing pad 11 or an interface pad. It is to be appreciated that different configurations of abrading members and their mutual attachments are well known in the industry, and such knowledge readily applies here as well.

Still referring to FIG. 1, in orbital abrading apparatuses, including random orbital apparatuses, the center of the spindle 4 may be offset from that of the shaft balancer 10 with reference to their center lines on the horizontal center axes (the dimension Y in FIG. 1). Therefore, during rotating of the shaft balancer 10, the spindle 4 may be made to travel in a circular path around the center of the shaft balancer 10. Consequently, the abrading members attached to the spindle 4 may be arranged to move in an orbital pattern.

Typically, particularly in random orbital abrading apparatuses, and as illustrated in FIG. 1, the spindle 4 may be attached to the shaft balancer 10 via a spindle bearing 3 or spindle bearings 3 such that the spindle 4 may rotate freely around its rotational axis relative to the rotation of the shaft balancer 10 around its rotational axis. Consequently, in addition to travelling in a circular path around the center of the shaft balancer 10, the spindle 4 may additionally rotate around its rotational axis such that the rate of rotation of the spindle 4 may differ from that of the shaft balancer 10.

Henceforth, the notion "spindle bearing 3" is to be understood to refer to a bearing arrangement for the spindle 4 comprising one, two or more individual bearings (i.e. individual bearing assemblies) unless expressly otherwise stated.

As is well understood in the industry, the purpose of the spindle bearing 3 is to provide low friction for the rotating motion of the spindle 4 relative to the shaft balancer 10 as well as to provide the spindle 4 with structural support in one or more directions.

The spindle bearing 3 may be, for example, a ball bearing or a cylindrical roller bearing. It is to be appreciated that bearings and their use are well known in the industry and such knowledge readily applies to the spindle bearing 3.

The spindle bearing 3 may be of a pre-greased type in the interest of achieving a service free and simple construction. This means that the lubricant, such as grease, required in the spindle bearing 3 is inserted into the spindle bearing 3 during manufacturing, and the finished spindle bearing 3 constitutes a sealed enclosure such that subsequent lubrication by the user may not be intended and/or practical and/or possible.

As one of the alternatives to using a pre-greased bearing as the spindle bearing 3, the spindle bearing 3 may be arranged to be lubricated with oil circulation fed into and out from the spindle bearing 3 by means external to the spindle bearing 3. This, however, leads to a more complex implementation due to, for example, the required external means for arranging the oil circulation. Yet, the disclosed solution for cooling the spindle bearing 3 may be applied in the case of such a circulating oil-based lubrication as well.

Figure 7:
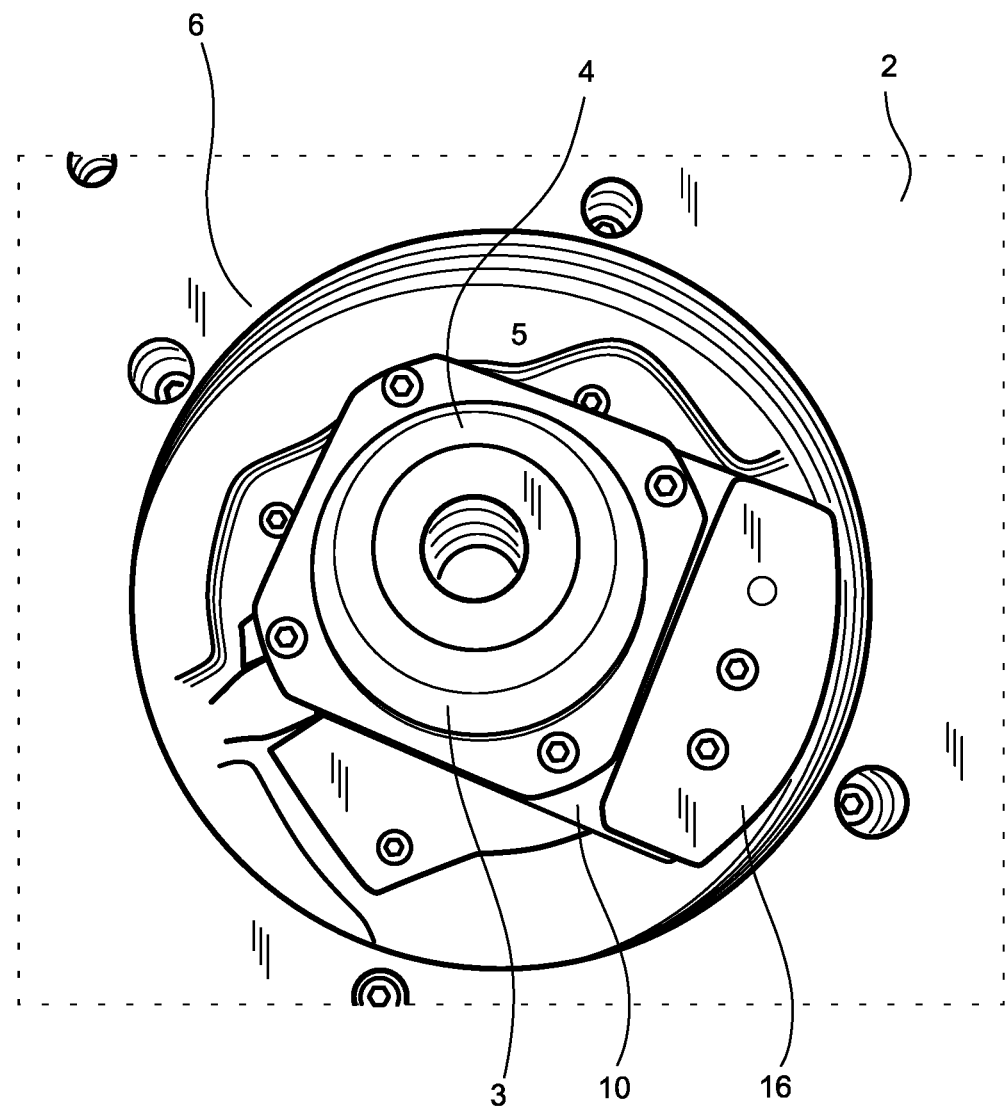
FIG. 7 illustrates overheating-induced escape of spindle bearing lubricant from within a spindle bearing to the walls of a spindle bearing chamber in a housing without conduits.

Increase in the temperature of the spindle bearing 3 is generally undesirable. This is because, for example, in elevated temperatures, such as more than 110° C. or 120° C., commonly used pre-grease lubricants tend to cook and/or undergo a heat-induced drop in viscosity (i.e. thinning) and consequently escape from the bearing enclosure. This, in turn, leads to increased heat generation in the spindle bearing 3 during use due to decreased lubrication, risking bearing failure or even the failure of the entire apparatus as a result. Such undesirable leaking out of lubricant from the spindle bearing 3 due to overheating is illustrated in FIG. 7, depicting a conventional implementation without any cooling conduits 1 according to the disclosed solution. In this FIG. 7, it can be seen that the lubricant escaped from the spindle bearing 3 has been propelled outward due to the rapid rotational movement of the spindle 4 and accumulated on the spindle bearing chamber wall 6. As a result, the lubrication of the spindle bearing 3 tends to be reduced, exacerbating the overheating even further.

Referring to FIG. 1 again, the spindle bearing 3 may be located within a spindle bearing chamber 5. As illustrated in FIG. 1, the spindle bearing chamber 5 may be a recessed space in the housing 2 of the abrading apparatus, surrounded by a spindle bearing chamber wall 6. Herein, recessing refers to that relative to the lowest point of the housing 2 (i.e. a recess upwards as illustrated in FIG. 1) as viewed from the side of the abrading apparatus with the rotating abrading members located at the bottom. The lowest point of the housing 2 is may be consequential as it may determine where (i.e. how low) the rotary abrading members have to be positioned for there to be a clearance 18 between the rotary abrading members and the housing 2 so that the rotary abrading members may rotate without a contact with the housing 2.

Figure 5A:
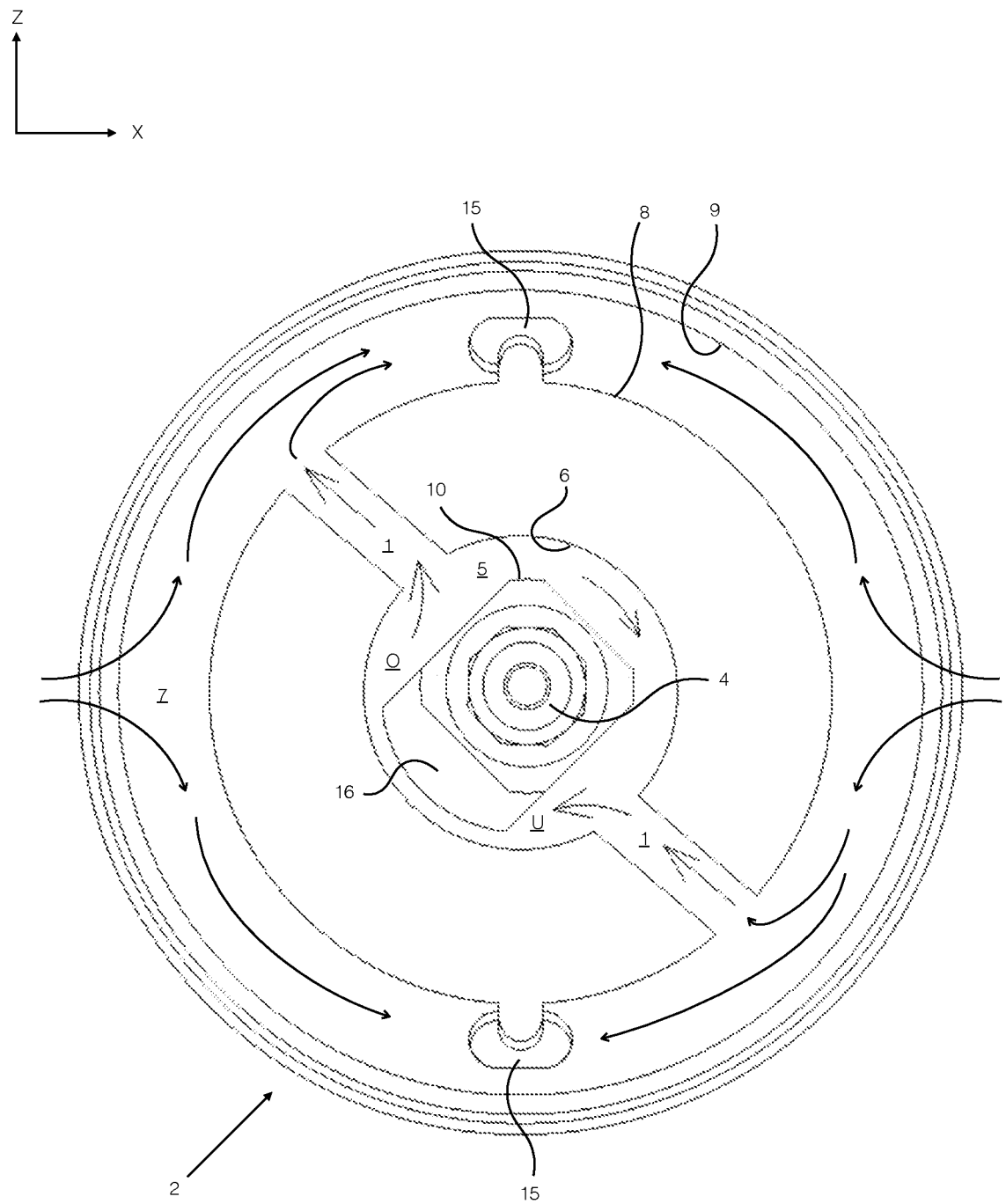
FIGS. 5a and 5b schematically illustrate, in different rotary positions of a shaft balancer, a housing comprising conduits, a spindle and the shaft balancer of a random orbital abrading apparatus, as viewed from below and with arrows denoting flow of air.
Figure 5B:
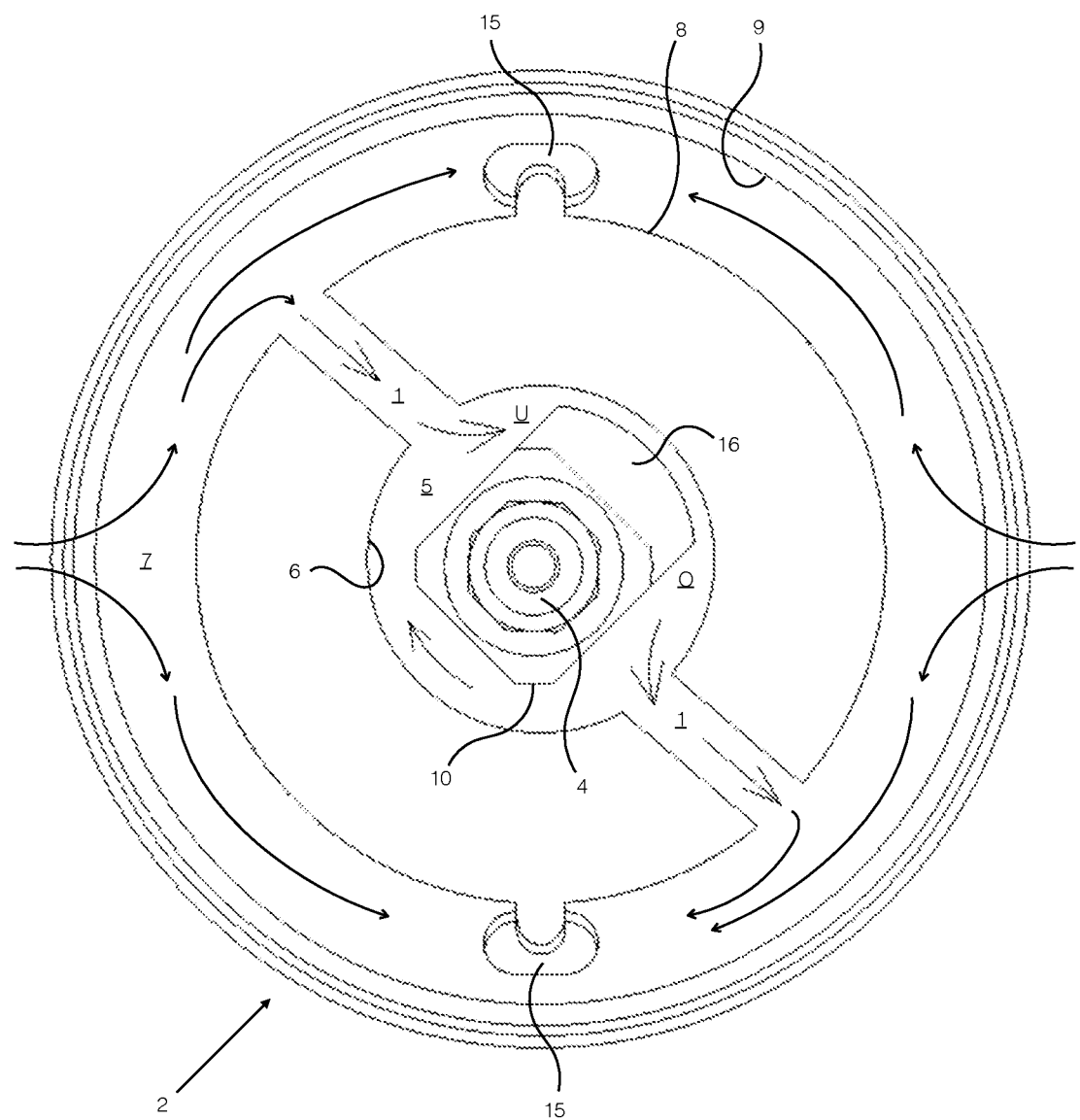
Figure 6:
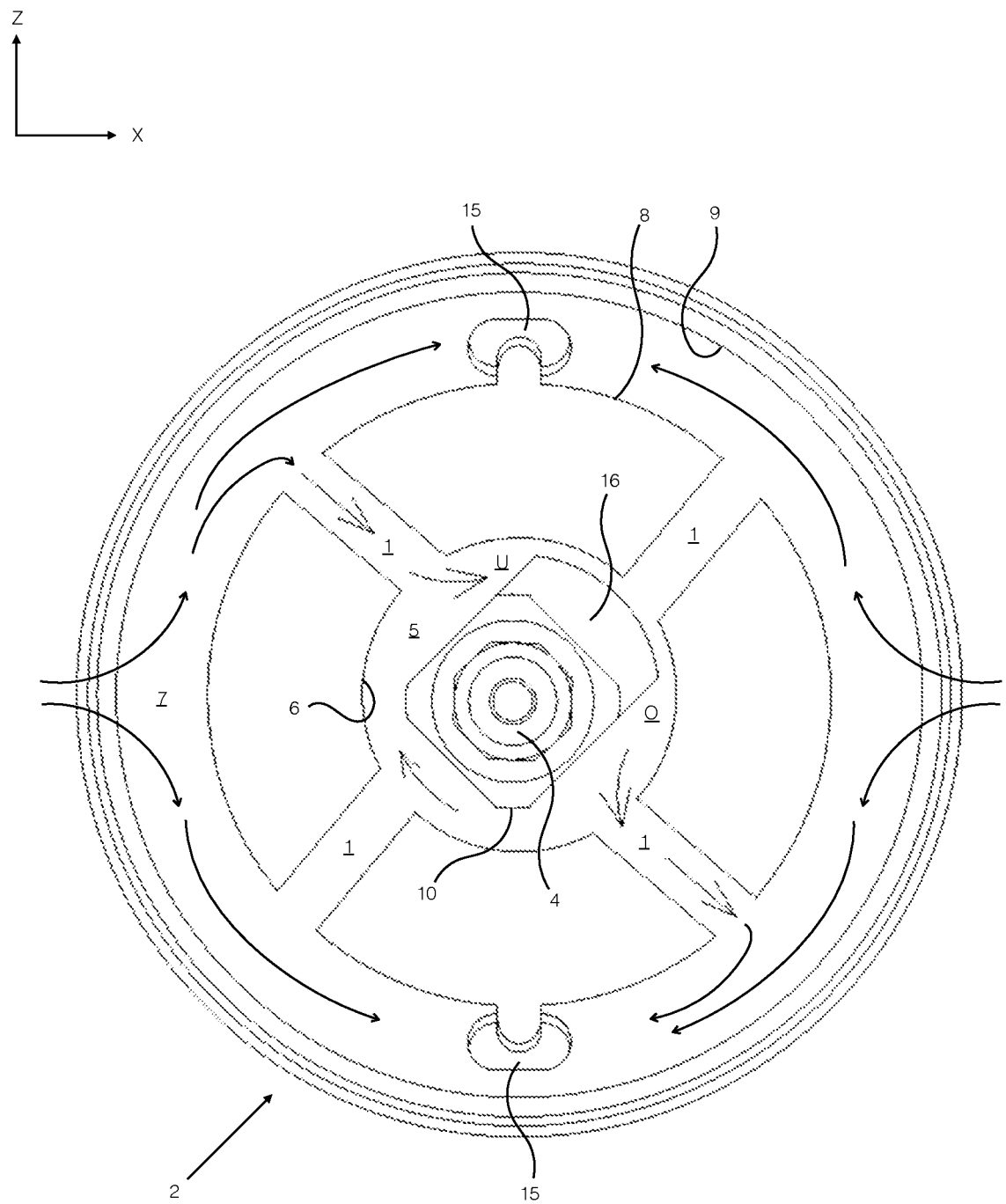
FIG. 6 schematically illustrates a housing comprising conduits, a spindle and the shaft balancer of a random orbital abrading apparatus, as viewed from below and with arrows denoting flow of air.

The spindle bearing chamber 5 may be, for example, a circular recess at the center of the housing 2, as in the embodiments illustrated in FIGS. 5a, 5b and 6.

The housing 2 is a component of the abrading apparatus which may house, at least partly, the shaft balancer 10, the spindle 4 and the rotary abrading members, all of which may rotate. Some of the purposes of the housing 2 include preventing potentially injurious access to the aforementioned rotating components and/or substantially reducing the uncontrolled escape of abrading debris to the surrounding environment. In the abrading apparatus, the housing 2 may be, for example, a separate part or an assembly comprising separate parts or it may be integrated into (i.e. be an aspect of) the body of the abrading apparatus. In the example embodiment illustrated in FIG. 1, the housing is a separate part which may be attached to the abrading apparatus, for example to its body. Such attachment may be accomplished with, for example, screws or bolts.

Still referring to FIG. 1, in addition to housing the spindle bearing 3, the spindle bearing chamber 5 of the housing 2 may be arranged to house at least a portion of the shaft balancer 10 such that the shaft balancer 10 may rotate within the spindle bearing chamber 5.

Figure 3:
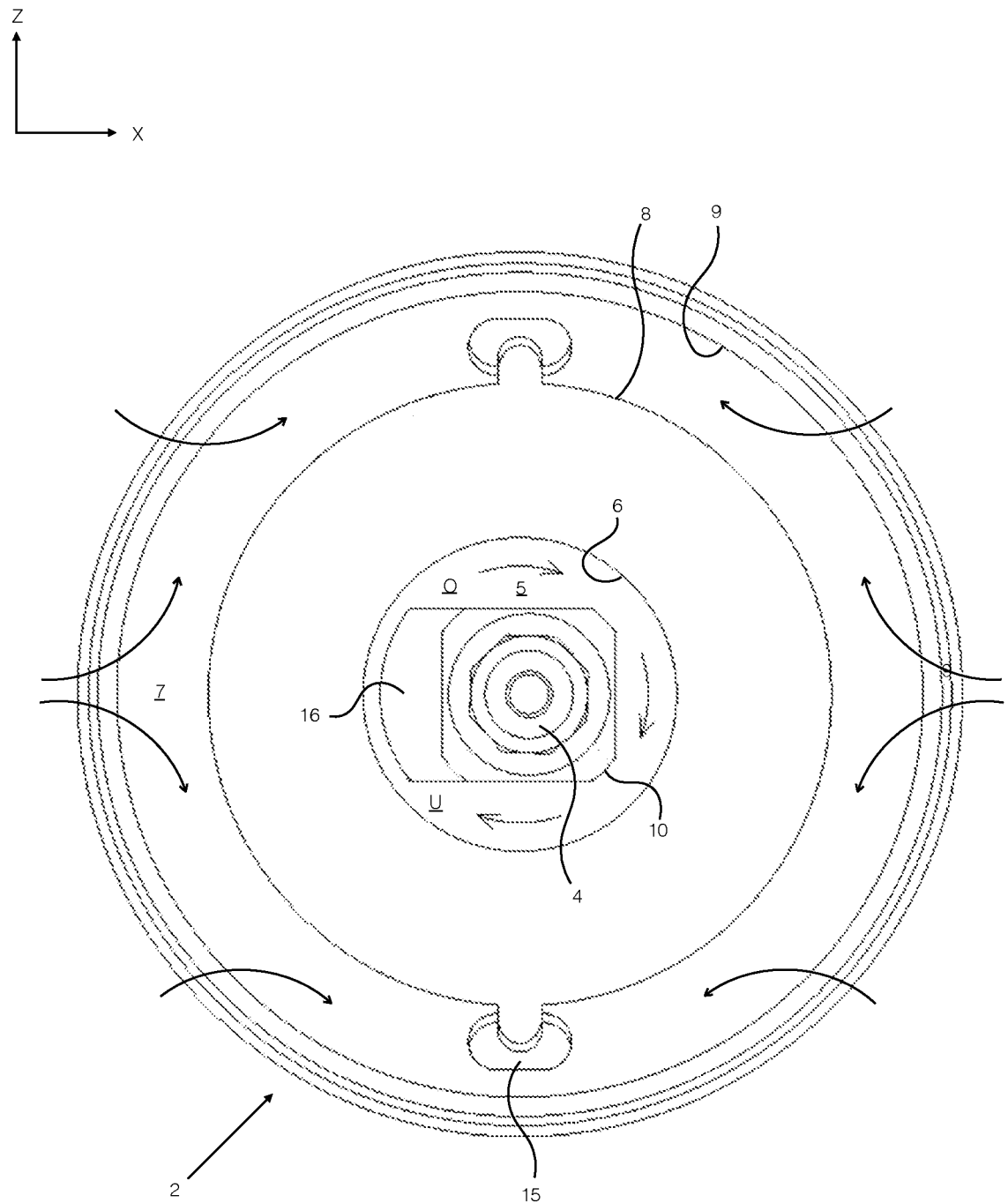
FIG. 3 schematically illustrates a conventional housing, a spindle and a shaft balancer of a random orbital abrading apparatus, as viewed from below.

The spindle bearing chamber 5 may be circular in shape with respect to the horizontal section (i.e. on the X-Z plane) of the spindle bearing chamber 5 as defined by the spindle bearing chamber wall 6, as illustrated in, FIG. 3, for example. Alternatively, the spindle bearing chamber 5 may be correspondingly of a different shape, such as triangular or rectangular or defined by a polygon as long as the rotating components housed within the spindle bearing chamber 5 may be arranged to rotate within the spindle bearing chamber 5.

As illustrated in FIG. 1, the housing 2 may also define other spaces such as a suction chamber 7. The suction chamber 7 refers to a recessed space in the housing 2 of the abrading apparatus surrounded by an inner suction chamber wall 8 and an outer suction chamber wall 9. Herein, recessing refers to that relative to the lowest point of the housing 2 (i.e. a recess upwards) as viewed from the side of the abrading apparatus with the rotating abrading members located at the bottom.

The suction chamber 7 may be, for example, a toroidal recess at the outer periphery of the housing, as in the embodiments illustrated in FIGS. 5a, 5b and 6. The suction chamber 7 may have various cross-sectional shapes, as viewed from the side as in FIG. 1, such as a triangular or a rectangular shape, or a shape defined by a polygon. Such shapes may additionally be smoothed, such as rounded from their corners.

As illustrated in FIG. 3, the spindle bearing chamber 5 may be located substantially centrally in the housing 2 (on the X-Z plane), whereas the suction chamber 7 may correspondingly be arranged further outward from the center of the housing (again, on the X-Z plane), such as near the outer wall of the housing 2 which outer wall defines the circumference of the housing 2 on the X-Z plane. Such an arrangement of the suction chamber 7 near the outer wall of the housing 2 may be advantageous for arranging suction conduits 15 for extracting abrading debris such that the means for extracting abrading debris, such as means of providing suction pressure, may be attached to suction conduits 15 such that there remains enough room towards the center of the housing 2 for the body of the abrading apparatus above the housing 2 (on the Y axis, as viewed in accordance with FIG. 1).

The suction chamber 7 may take the form of a channel, open at the bottom (i.e. towards the rotary abrading members), which travels 360 degrees on the Z-X plane, as illustrated in FIG. 3. By travelling 360 degrees on the Z-X plane, the suction pressure connected to a suction conduit 15 or suction conduits 15 may be conveyed throughout the suction chamber 7 over the entire circumference of the housing 2, and air in the suction chamber 7 may similarly travel over the entire circumference of the housing 2.

The suction chamber 7 may be arranged to be connected to a suction conduit 15 or two or more suction conduits 15 (depicted in FIGS. 1 and 2, not depicted in FIG. 4) for the purposes of extracting air and abrading dust away from the abrading process. As is well known in the industry, such suction conduits 15 may be connected to a source of suction pressure (not depicted) adapted to effect air and dust extraction by means of suction pressure.

Figure 2:
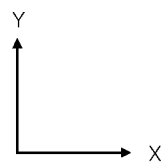
FIG. 2 schematically illustrates a cross section of a conventional random orbital abrading apparatus equipped with a spindle fan, as depicted without the body of the abrading apparatus comprising a motor.
Figure 2:
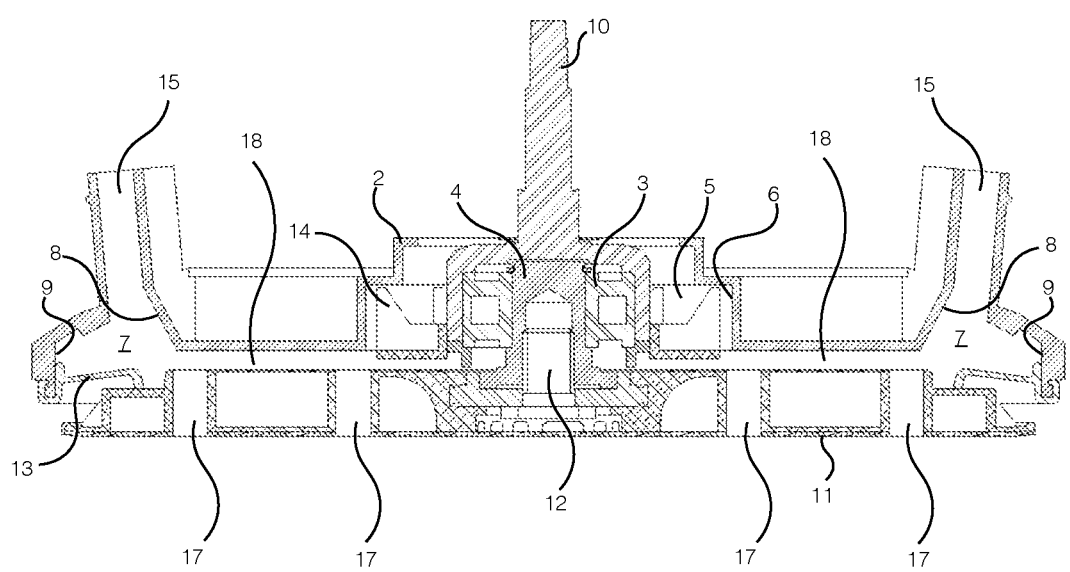

Referring to FIG. 1 and FIG. 2, the rotary abrading member or members may be attached to the spindle 4 with the fixing 12. In FIG. 1 and FIG. 2, of such rotary abrading members is depicted a backing pad 11 to which may be attached an intermediate pad or an abrading article, for example by means of a hook-and-loop type of attachment. The rotary abrading member or members may be arranged such that they comprise abrading debris extraction conduits 17 adapted to convey abrading debris away from the workpiece surface being abraded, for example through the rotary abrading members to their other (upper) side, from where the abrading debris may be further conveyed to the suction chamber 7 to be ejected through the suction conduit or suction conduits 15.

To effect such a dust extraction pathway from the workpiece surface being abraded to the suction conduit 15 and to ejection from there, a seal 13 may be arranged to be located between the outer suction chamber wall 9 of the housing 2 and the rotary abrading members such as the backing pad 11, as depicted in FIG. 1. By means of the seal 13, the suction pressure conveyed to the suction chamber 7, such as via the suction conduit 15 may be, at least partly, prevented from escaping between the housing 2 and the rotary abrading members such as the backing pad 11. Towards this end, the seal 13 may be substantially of the same shape on the Z-X plane as the outer suction chamber wall 9. That is, if the outer suction chamber wall 9 is circular on the Z-X plane, as illustrated in FIG. 3 for example, the seal 13 is to be circular on the Z-X plane as well at least with respect to the outer boundary of the seal 13 for the seal 13 to provide effective sealing between the suction chamber 7 and the outer suction chamber wall 9. The same shape-wise correspondence applies to the inner boundary of the seal 13 and the surface of the rotary abrading members, such as the backing pad 11, against which the seal is to bring about sealing. It is to be appreciated that such arrangement and use of the seal or seals 13 is well known in the industry and that such knowledge readily applies here.

Conventionally, as illustrated in FIG. 1, the travel of air to and from the spindle bearing chamber 5 is restricted because of a small clearance 18 between the rotary abrading member closest to the housing 2 and the housing 2. In such a case, if the housing, moreover, comprises two or more suction conduits 15, especially when substantially distanced from each other as illustrated in FIG. 2 and FIG. 3, air in the spindle bearing chamber 5 tends to circulate within the spindle bearing chamber 5 with very little exchange of air, as denoted with arrows within the spindle bearing chamber 5 in FIG. 3. This is because air originating from outside the housing 2, i.e. outside the abrading apparatus, tends to be conveyed to the nearest suction conduit 15 without travelling via the spindle bearing chamber 5, as illustrated with arrows depicting air flows in FIG. 3 in the case of two suction conduits 15 located at opposite sides of the housing 2, i.e. distanced 180 degrees apart from each other on the Z-X plane.

As is known in the industry, it may be possible to attempt to enhance the flow of air by providing a spindle fan comprising spindle fan blades 14 around the assembly comprising the spindle bearing, as depicted in FIG. 2. The purpose of the spindle fan blades 14 in such an arrangement typically is to effect the movement of air such that hot air in the immediate vicinity of the spindle bearing 3 is expelled outward. However, as depicted in FIG. 3, such an arrangement is restricted in its cooling effect on the spindle bearing 3 due to the small clearance 18 between the rotary abrading members such as the backing pad 11 and the housing 2. Thus, with such a spindle fan blade 14 arrangement, the flow of air is still substantially conforms to what is illustrated in FIG. 3. That is, air tends to a substantial degree circulate within the spindle bearing chamber 5 instead of being to a substantial degree exchanged.

Figure 4:
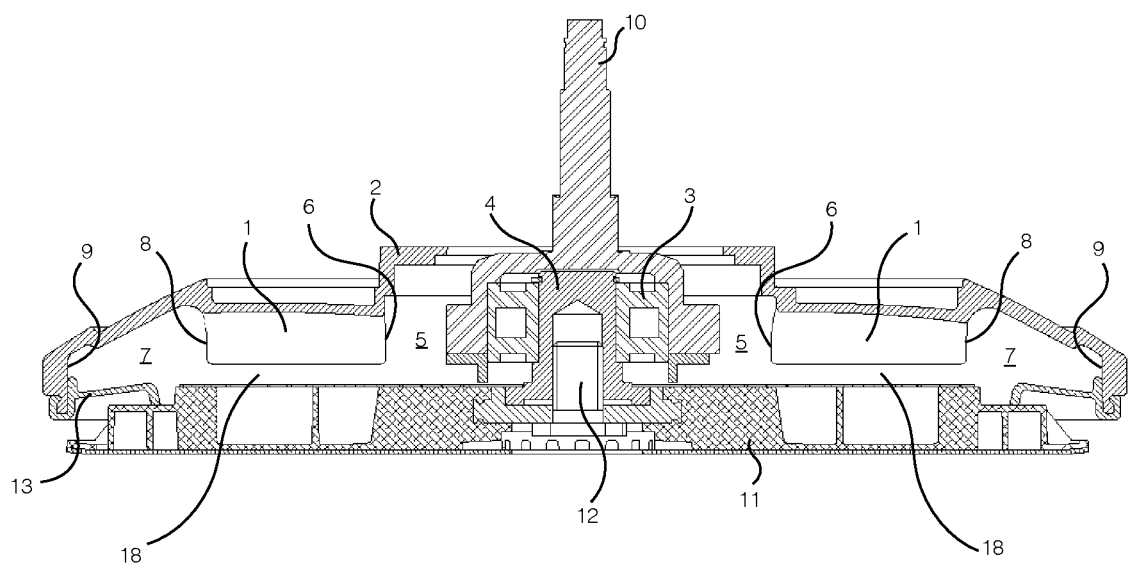
FIG. 4 schematically illustrates a cross section of a random orbital abrading apparatus comprising a housing with conduits, as depicted without the body of the abrading apparatus comprising a motor.

Referring to FIG. 4, according to the disclosed solution, the flow of air to and from the spindle bearing chamber 5 may be improved, and therefore the cooling of the spindle bearing 3 enhanced, by arranging one or more conduits 1 in the housing 2. FIGS. 5a and 5b illustrate such conduits 1 according to one example embodiment as viewed from below.

Such conduits 1 may be arranged such that each conduit 1 provides an air passage which extends from the spindle bearing chamber wall 6 to the inner suction chamber wall 8, thereby enabling less restricted flow of air than through the clearance 18 between the housing 2 and the rotating abrading members such as the backing pad 11.

The clearance 18 between the housing 2 and the rotating abrading members may be less than 25 mm, preferably less than 10 mm, and most preferably less than 5 The clearance 18 is a compromise of achieving as low a sander as possible, but sufficient enough to allow the rotating abrading members to rotate freely and/or air with abrading debris to be removed out from abrading debris extraction conduit or conduits 17 in the backing pad 11.

Figure 10A:
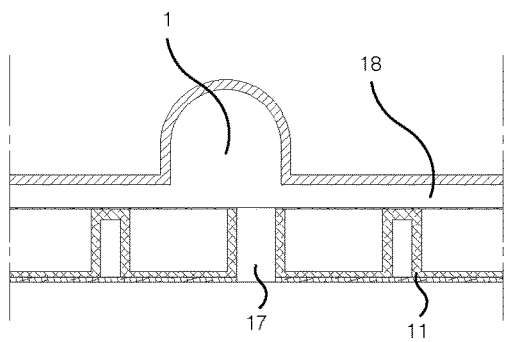
FIGS. 10a to 10d schematically illustrate examples for the cross-sectional shape of a conduit.
Figure 10B:
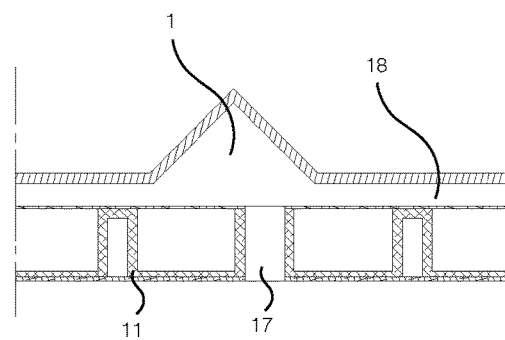
Figure 10C:
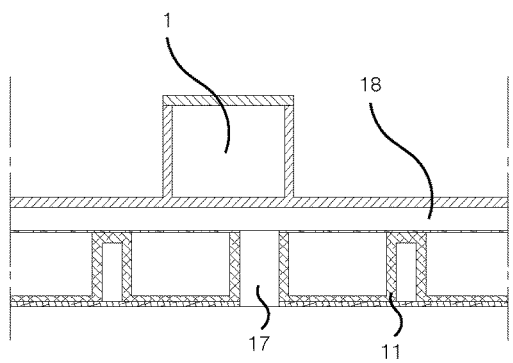
Figure 10D:
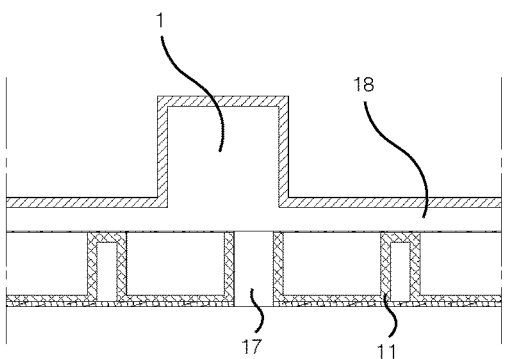

The conduits 1 may have various cross-sectional shapes with respect to their cross section in the direction of their travel, as illustrated by way of examples in FIGS. 10a to 10d. As illustrated in FIG. 10a, the conduit 1 may have an inverted U-shaped cross section, wherein the inverted U may be open towards the rotating abrading members such as the backing pad 11. As illustrated in FIG. 10b, the conduit 1 may have a triangular cross-section, wherein the conduit may be open towards the rotating abrading members such as the backing pad 11. As illustrated in FIG. 10c, the conduit 1 may have a closed rectangular cross section. As illustrated in FIG. 10d, the conduit 1 may have a rectangular cross section, wherein the conduit may be open towards the rotating abrading members such as the backing pad 11.

The example cross sections illustrated in FIGS. 10a to 10d are presented as examples. Therefore, it is to be appreciated that different cross-sectional shapes beyond those illustrated in FIGS. 10a to 10d may be devised according to application, and that such different shapes may be implemented either as closed forms such as in the example illustrated in FIG. 10c, or as open towards the rotating abrading members such as the backing pad 11.

Correspondingly, the conduit 1 may have various cross-sectional shapes with respect to their cross section as viewed from the side as illustrated in FIG. 4 and as viewed from below as illustrated in FIG. 3 and FIGS. 5 to 7. This is to say that such conduits 1 may have various paths of travel from the spindle bearing chamber wall 6 to the inner suction chamber wall 8.

FIGS. 11a to 11e illustrate examples of such different paths of travel of conduits 1 as viewed from below. Specifically, the examples illustrated in FIGS. 11a to 11e illustrate variants to the conduit 1 arrangement illustrated in FIGS. 5a and 5b.

Figure 11A:
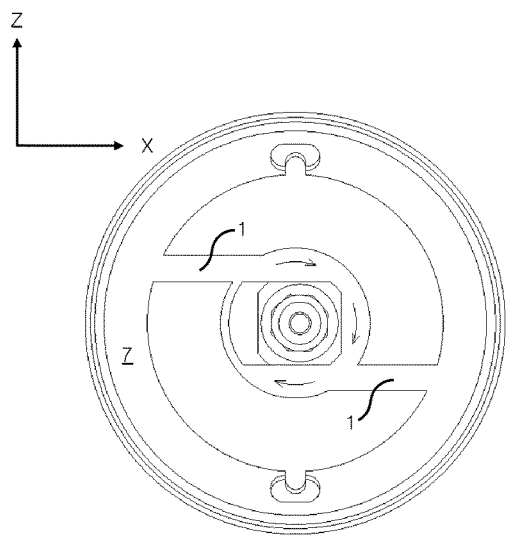
FIGS. 11a to 11e schematically illustrate examples for the travel paths of a conduit.

As illustrated in FIG. 11a, the conduits 1 may travel along straight paths with constant widths from the spindle bearing chamber wall 6 to the inner suction chamber wall 8 non-radially.

Figure 11B:
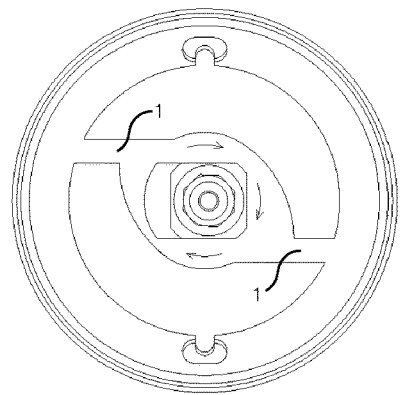

As illustrated in FIG. 11b, the conduits 1 may travel along straight paths from the spindle bearing chamber wall 6 to the inner suction chamber wall 8 non-radially such that the opposite side walls of the conduits 1 are of different length, as measured as the distance from the spindle bearing chamber wall 6 to the inner suction chamber wall 8 whereby the spindle bearing chamber 5 has a non-circular elongated cross-sectional shape as viewed from below.

Figure 11C:
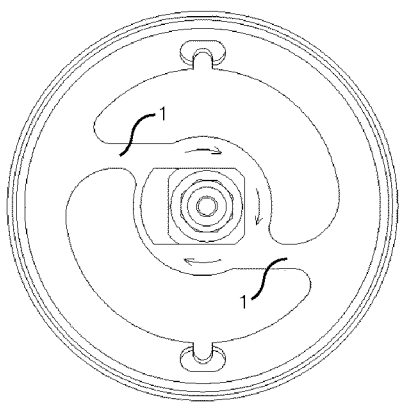

As illustrated in FIG. 11c, the conduits 1 may travel along substantially straight paths from the spindle bearing chamber wall 6 to the inner suction chamber wall 8 non-radially such that the conduits 1 comprise funnel-shaped sections opening towards the spindle bearing chamber wall 6 and the inner suction chamber wall 8.

Figure 11D:
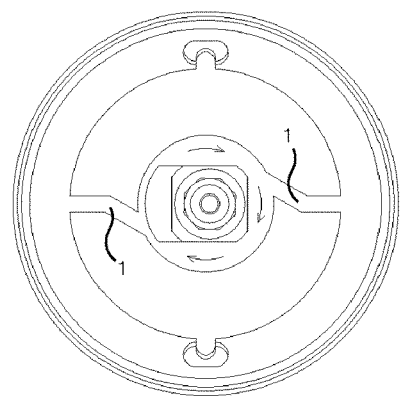

As illustrated in FIG. 11d, the conduits 1 may travel along angular paths with constant widths from the spindle bearing chamber wall 6 to the inner suction chamber wall 8. According to the example illustrated in FIG. 11d, such angularity may constitute the conduits 1 comprising a first radially travelling section beginning at the inner suction chamber wall 8 and a second non-radially travelling section beginning at the spindle chamber wall 6.

Figure 11E:
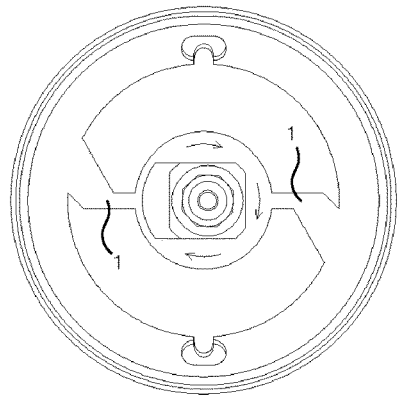

As illustrated in FIG. 11e, the conduits may comprise a first radially travelling section with a constant width beginning at the spindle chamber wall 6 and a second funnel-shaped section beginning at the inner suction chamber wall 8 and opening toward the inner suction chamber wall 8.

The housing 2 may comprise conduits of one cross-sectional type, for example one of the example cross-sectional types illustrated in FIGS. 10a to 10d. Alternatively, different cross-sectional shapes may be combined such that the conduits 1 in the housing 2 may comprise conduits 1 with two or more different cross-sectional types, such as two or more of the example cross-sectional types illustrated in FIGS. 10a to 10d.

The housing 2 may comprise conduits of one travel path type, for example one of the example travel path types illustrated in FIGS. 5a, 5a, 6 and 11a to 11e. Alternatively, different travel path types may be combined such that the conduits 1 in the housing 2 may comprise conduits 1 with two or more different travel path types, such as two or more of the example travel path types illustrated in FIGS. 5a, 5a, 6 and 11a to 11e.

The example travel path types illustrated in FIGS. 11a to 11de are presented as examples. Therefore, it is to be appreciated that different travel path types beyond those illustrated in FIGS. 11a to 11e may be devised according to application.

Different cross-sectional types and/or travel path types for the conduits 1 may also be developed for the purpose of routing the conduits 1 advantageously so as to avoid traversing the loci where different parts of the abrading apparatus, such as cables, motor, fan and/or lights, are situated.

Advantageously, the conduits 1 are, in terms of the surface of their walls, as smooth as possible. This is advantageous because deviations from smoothness, i.e. surface roughness in the conduit 1 walls, may disturb the flow of air for example by inducing turbulence. In addition, such deviations from smoothness may result in accumulation of abrading or other debris on the conduit 1 wall, which may, in turn, result in reduced and/or disturbed air flow in the conduit 1.

FIGS. 5a and 5b illustrate, according to one example embodiment, two conduits 1 in the housing 2 as viewed from below without any rotary abrading members attached to the spindle 4. FIGS. 5a and 5b illustrate the same embodiment in two different rotary positions of the shaft balancer 10, with the shaft balancer 10 rotating clockwise.

According to this example embodiment, there are two conduits 1 located, with respect to the horizontal section of the housing 2 on the Z-X plane, at opposite sides of the spindle bearing chamber 5. In other words, the openings of the conduits 1 are distanced 180 degrees apart from each other both on the spindle bearing chamber wall 6 and the inner suction chamber wall 8.

According to this embodiment, the conduits 1 are open at their bottoms. That is, the conduits 1 are open towards the rotating abrading members (i.e. downwards with respect to FIG. 4). The cross-sectional shape of the conduits 1 may be, for example, U-shaped, triangular or rectangular According to this embodiment, the conduits 1 may extend radially or substantially radially from the spindle bearing chamber wall 6 to the inner suction chamber wall 8 along a straight path.

Alternatively, the conduits 1 may be not open at their bottoms, i.e. be not open towards the rotating abrading members.

Referring back to the embodiment illustrated FIGS. 5a and 5b, the rotating of the shaft balancer 10 creates an overpressure O in front of the protruding balancing element 16 of the rotating shaft balancer 10 (with respect to the rotational direction of the shaft balancer 10) as the protruding balancing element 16 of the rotating shaft balancer 10 pushes a column of air in front of it when it rotates. Correspondingly, an underpressure U is formed behind the protruding balancing element 16 of the rotating shaft balancer 10. The same applies to the overpressure O and to the underpressure U in other embodiments of the disclosed solution, unless stated otherwise. The overpressure O and the underpressure U refer to a positive and a negative deviation from the average air pressure in the spindle bearing chamber 5, respectively.

The clearance between the outer wall 19 of the protruding balancing element 16 of the shaft balancer 10 and the spindle bearing chamber wall 6 may be consequential for the formation and magnitude of the overpressure O and the underpressure U. This is because a greater clearance may allow air to leak through the clearance from the overpressure O toward the underpressure U. Therefore, the overpressure O and the underpressure U may be adjusted according to application by selecting the clearance between, i.e. the distance between, the outer wall 19 of protruding balancing element 16 of the shaft balancer 10 and the spindle bearing chamber wall 6. Such a clearance refers to the smallest distance between the outer wall 19 of the protruding balancing element 16 of the shaft balancer 10 and the spindle bearing chamber wall 6 during a full rotation of the shaft balancer 10 around its rotational axis.

According to an example embodiment illustrated in FIGS. 5a and 5b, the clearance between the outer wall 19 of the protruding balancing element 16 of the shaft balancer 10 and the spindle bearing chamber wall 6 may be less than 25 mm, preferably less than 10 mm and most preferably less than 5 mm.

According to this example embodiment illustrated in FIGS. 5a and 5b, the underpressure U draws air into the spindle bearing chamber 5 from the conduit 1 located nearest to the underpressure U. Correspondingly, air to that conduit 1 originates from the region of the suction chamber 7 near to the opening of that conduit 1 on the inner suction chamber wall 8. Correspondingly, the overpressure O is discharged by air exiting from the spindle bearing chamber 5 via the conduit 1 located nearest to the overpressure O, from which conduit 1 air exits to the region of the suction chamber 7 near to the opening of this conduit on the inner suction chamber wall 8.

Such dynamics of air flow are here and subsequently presented as idealized for the purposes of clarity of expression. It is to be appreciated, as a person skilled in the art readily does, that some proportion of air flows does not in actuality conform to this idealized presentation. For example, some of the overpressure O may be discharged via the clearing 18. Thus, the idealized air flows are to be appreciated in explaining the general idea of the invention.

By arranging the dimensions of the clearance 18 between the housing 2 and the rotary abrading members together with the number of the conduits 1 and their dimensions such as cross-sectional area and length, the drawing of air into and expelling of air from the spindle bearing chamber 5 may be optimized according to application.

As illustrated in FIGS. 5a and 5b, as the shaft balancer 10 rotates, the loci of the overpressure O and the underpressure U in the spindle bearing chamber 5 change correspondingly. Consequently, as is made evident by comparing FIGS. 5a and 5b, the conduit or conduits 1 conveying air to the spindle bearing chamber 5 and the conduit or conduits 1 conveying air away from the spindle bearing chamber 5 change in accordance to the rotary position of the shaft balancer 10 as the rotary position of the shaft balancer 10 determines the loci of the overpressure O and the underpressure U in the shaft bearing chamber 5 when the shaft balancer 10 is rotating. That is, in a certain rotary position of the shaft balancer 10, a particular conduct 1 may convey air into the spindle bearing chamber 5 whereas in another rotary position of the shaft balancer 10 the same conduit 1 may convey air away from the spindle bearing chamber 5.

Moreover, in some other embodiments comprising more than two conduits 1, such as according to what is illustrated in FIG. 6 in the case of a four-conduit 1 embodiment, in a certain rotary position of the shaft balancer 10, a particular conduct 1 may in a particular rotary position of the shaft balancer 10 not convey any substantial amount of air to or from the spindle bearing chamber 5. This will be elaborated on more in detail below.

By means of the above-described travel of air via the conduits 1, hot air, as heated by the dissipation of heat form the spindle bearing 3 for example, may exit the spindle bearing chamber 5 and fresh cooling air may be drawn into the spindle bearing chamber 5 to receive additional heat dissipating from, for example, the spindle bearing 3. In other words, such drawing in and exiting of air to and from the spindle bearing chamber 5 brings about an exchange of air in the spindle bearing chamber 5. This exchange of air may be employed to cool down the spindle bearing 3.

In addition, or alternatively, such exchange of air in the spindle bearing chamber 5 may be employed to cool down other components residing or partly residing or extending into the spindle bearing chamber 5, such as the shaft balancer 10. Such other components may generate heat themselves or receive heat as conducted from elsewhere in the abrading apparatus such as the shaft balancer 10 receiving heat as conducted from the motor of the abrading apparatus.

Such cooling effect is possible as the air originating from the external environment typically is substantially cooler than the air in the spindle bearing chamber 5 which is heated by the heat dissipated by the spindle bearing 3 and/or other components residing or partly residing or extending into the spindle bearing chamber 5, such as the shaft balancer 10.

In other embodiments, there may be a different number of conduits 1 and/or the conduits 1 may be differently arranged in the housing 2 while adhering to the idea of exchanging air in the spindle bearing chamber 5 via the conduits 1 and thereby providing cooling to the spindle bearing 3 and/or other components residing or partly residing or extending into the spindle bearing chamber 5, such as the shaft balancer 10.

FIG. 6 illustrates another example embodiment for the arrangement of the conduits 1. In this embodiment, there are four conduits 1 in the housing 2 arranged such that the conduits 1 extend radially or substantially radially along straight paths from the spindle bearing chamber wall 6 to the inner suction chamber wall 8.

The conduits 1 may be open at their bottoms, i.e. open towards the rotating abrading members (i.e. downwards with respect to FIG. 4), like in the example embodiments illustrated in FIGS. 5a, 5b and 6. Thus, the conduit 1 may constitute a channel which is open towards the rotating abrading members.

The conduits 1 may be circumferentially equidistant from each other at the spindle bearing chamber wall 6 and the inner suction chamber wall 8. For example, in the embodiment illustrated in FIG. 6, the conduits 1 are equally or substantially equally spaced apart, i.e. are distanced by approximately 90 degrees apart from each other both with respect to their opening on the spindle bearing chamber wall 6 and the inner suction chamber wall 8. Furthermore, the housing in this example embodiment comprises two suction conduits 15 similarly equally distanced apart from each other, i.e. are located at different sides of the housing 2.

In this example embodiment, the cross-sectional shapes of the conduits 1 may be, for example, U-shaped triangular or rectangular.

In this example embodiment, as illustrated in FIG. 6, the rotation of the shaft balancer 10 (again, clockwise) may bring about the overpressure O and the underpressure U in consistency with what has been explained above. Furthermore, the overpressure O may be discharged from the spindle bearing chamber 5 to the conduit 1 nearest to it, and the underpressure U may draw in air from the conduit 1 nearest to it, as illustrated by the arrows in the conduits 1 in FIG. 6. Thus, no or relatively little air moves in the other two conduits 1 which for the purposes of convenience of expression may be here called "inactive conduits". This is because—with respect to the rotational position of the shaft balancer 10—one of the inactive conduits (pointing towards lower left from the spindle bearing chamber 5 in FIG. 6) is further away from the overpressure O than the non-inactive conduit 1 (pointing towards lower right from the spindle bearing chamber 5 in FIG. 6) which offers a more immediate discharging avenue for the overpressure O, and because the other of the inactive conduits 1 (pointing towards upper right from the spindle bearing chamber 5 in FIG. 6) may be obstructed or partially obstructed by the shaft balancer 10. As can be readily understood in view of what has been explained above, the conveyance of air in the conduits 1 changes as the rotary position of the shaft balancer 10 changes.

By increasing the number of conduits 1, such as from two conduits as illustrated in FIGS. 5a and 5b to four conduits 1 as illustrated in FIG. 6, it may be possible to increase the number of cycles with which air is exchanged per one revolution of the shaft balancer 10.

A spindle fan comprising spindle fan blades 14 arranged around the assembly comprising the spindle bearing 3 within the spindle bearing chamber 5, as illustrated in FIG. 2 may be employed in other embodiments of the disclosed solution, which may be, for example, the embodiments described above with the addition of a spindle fan. Such embodiments with a spindle fan may therefore adhere to the idea of exchanging air in the spindle bearing chamber 5 via the conduits 1 and thereby providing cooling to the spindle bearing 3 and/or other components residing or partly residing or extending into the spindle bearing chamber 5, such as the shaft balancer 10. In such embodiments, spindle fan blades 14 may be employed to facilitate the movement of air to and from the spindle bearing chamber 5 via the conduits 1 such as by means of increasing the magnitude or otherwise facilitating the build-up or travel of the overpressure O and the underpressure U in the spindle bearing chamber 5.

The conduits 1 may be brought about in the housing 2, for example, by incorporating the conduits 1 into a mold of the housing 2 upon manufacturing the housing 2 whereby the housing 2 comprising the conduits 1 may be manufactured by molding from a suitable material such as plastic. Such molding may be, for example, injection molding. Such plastic, in turn, may be, for example, acrylate butadiene styrene (ABS), polyamide (PA), polyethylene (PE), polyurethane (PUR), polyvinyl chloride (PVC) or polypropylene (PP).

Alternatively, the conduits 1 may be brought about in the housing 2, for example, by additively manufacturing (i.e. three-dimensionally printing) the housing 2 comprising the conduits 1. Such additive manufacturing of the housing 2 may use as its material, for example, a suitable plastic such as the plastics mentioned above or another material known suitable for additional manufacturing. Such an additive manufacturing of the housing 2 comprising the conduits may be particularly advantageous with complex conduit 1 shapes and/or with conduits 1 at least partially travelling inside the material of the housing 2.

Alternatively, or in addition, the conduits 1 may be brought about in the housing 2, for example, by first manufacturing the housing 2 without the conduits 1 in a manner known suitable in the industry and after that forming the conduits in the housing by way of, for example, milling the conduits 1 in the housing 2.

The following experimental tests provide empirical test results concerning the efficacy of the disclosed solution according to selected example embodiments.

Experimental Test 1

All the tests whose results are reported below for this experimental test were conducted with a mobile user-operated wall and ceiling abrading apparatus with a 350 W electric motor driving the shaft balancer 10 housing the spindle 4 and the spindle bearing 3. The motor was equipped with cooling flanges about 6.5 mm in length. The clearance 18 between the backing pad 11 and the lowest point of the housing 2 was about 4,5 mm, and the diameter of the backing pad 11 was 225 mm.

In the experiments 1-3, no dust extractor was connected to the suction conduits 15, and the suction conduits 15 remained open. In the experiment 4, the housing 2 comprised two suction conduits 15, like illustrated in FIG. 3 for example, connected to a dust extractor providing suction pressure to the suction conduits 15.

In the experiment 1, the housing did not comprise any conduits 1.

In the experiment 2, the housing comprised two conduits 1 consistently with FIGS. 5a and 5b. Each of the conduits 1 had a cross-sectional area of about 200 mm$^2$, the cross section being with respect to the direction of travel of the conduits from the spindle bearing chamber wall 6 to the inner suction chamber wall 8. Each of the conduits had a length of about 40 mm. Consistently with FIGS. 5a and 5b, the conduits were open at their bottom, i.e. were open towards the rotating abrading members.

In the experiment 3, the experiment 2 was modified by adding a spindle fan comprising spindle fan blades 14 around the shaft balancer 10. The spindle fan comprised eight blades with a total cross-sectional blade area of about 700 mm$^2$.

In the experiment 4, the experiment 2 was modified by attaching a source of suction pressure to the suction conduits 15 in the housing 2. Specifically, a dust extractor with a power of 1200 W was connected to the suction conduits 15.

In each experiment, the abrading apparatus was run for 30 minutes in an ambient room temperature with an 8000 rpm (revolutions per minute) rotational rate for the shaft balancer 10 with an average and substantially constant power consumption of about 350 W. For each experiment, the abrading apparatus was equipped with C3 clearance bearings.

The temperature measured was that of the electric motor. This was motivated by the fact that one of the goals of the invention is to reduce the running temperature of the motor of the abrading apparatus with improved cooling of the spindle bearing 3. The temperature of the electric motor was also deemed to be good proxy for the temperature of the spindle bearing 3 because in the abrading apparatus used in the tests the shaft balancer 10 is directly attached to the electric motor, the spindle bearing 3 is housed within the lower end of the shaft balancer 10, and both the spindle bearing 3 and the shaft balancer 10 have a high thermal conductivity due to being made of steel. Thus, a change in the temperature of the electric motor can be reasonably taken to be indicative of a change in the temperature of the spindle bearing 3, even though the temperature of the electric motor is not equal in magnitude to that of the spindle bearing 3.

The temperature of the electric motor was determined from the measured resistance of the winding of the motor, in accordance with the standard 60745-1 IEC:2006, with the resistance of the winding in room temperature as the baseline.

With the above-described experimental setup, the following results were obtained.

| Experiment | Motor winding temperature | Conduits | Spindle fan | Dust extractor | Change in motor winding temperature, vs. experiment 1 |
|---|---|---|---|---|---|
| 1 | 167.4° C. | 0 | — | — | |
| 2 | 152.4° C. | 2 | — | — | −15.0° C. |
| 3 | 150.0° C. | 2 | Yes | — | −17.4° C. |
| 4 | 145.9° C. | 2 | — | Yes | −21.5° C. |

From the experimental results it can be seen that the setup of two conduits 1 in consistency with FIGS. 5a and 5b lowers the motor winding temperature by 15° C., suggesting that the disclosed solution is effective in lowering the temperature of the spindle bearing in accordance with the reasoning presented above.

From the experimental results it can further be seen that the spindle fan slightly improves the cooling effect brought about by the two conduits 1, as a further 2,5° C. drop in the motor winding temperature was observed over experiment 2 following the addition of a spindle fan. This suggests that adding a spindle fan have a small cooling effect in comparison to the cooling effect of adding conduits 1. Therefore it stands to reason that the benefits of adding a spindle fan may not be appreciable when taking into account the resulting undesired abrading apparatus complexity, additional space within the apparatus required by the spindle fan, and increase in the manufacturing costs.

In addition, from the experimental results it can be seen that applying suction pressure to the suction conduits 15 is more efficacious in lowering the motor wiring temperature than adding a spindle fan, as a further 6,5° C. drop in the motor winding temperature was observed over experiment 2 following the application of suction pressure to the suction conduits 15. This suggests that applying suction pressure to the suction conduits 15 of the housing 2, as is a common practice in the industry, may increase the effectiveness of the disclosed solution in lowering the temperature of the spindle bearing 3, in accordance with the reasoning presented above, to a greater extent than adding a spindle fan.

Such an effect as observed in experiment 4 in conjunction with applying suction pressure to the suction conduits 15 is brought about by cold air being drawn into the suction chamber 7 and clearance 18 from the surrounding environment, as drawn in by the suction pressure. This decreases the temperature of the air in the suction chamber 7. The exchange of air in the spindle bearing chamber 5 via the conduits 1 to and from the suction chamber 7 makes the air in the spindle bearing chamber 5 correspondingly cooler. Thereby the cooling of the spindle bearing 3 is more efficient and the cooling of the motor of the abrading apparatus is more effective, as heat from the motor is conducted from the motor through the shaft balancer 10 to the spindle bearing chamber 5 with cooler air, as just explained.

Experimental Test 2

In order to obtain more direct temperature data from the spindle bearing 3, the housing of the spindle bearing 3 within the shaft balancer 10 was equipped with an irreversible temperature label. In this label, a white dot turns irreversibly into black if a temperature designated for the dot is reached.

The temperature label used in the test comprised the following designated temperatures: 190° F. (88° C.), 200° F. (93° C.), 210° F. (99° C.), 220° F. (104° C.) and 220° F. (110° C.), as shown in FIG. 8 clockwise beginning from the lower right.

Figure 8:
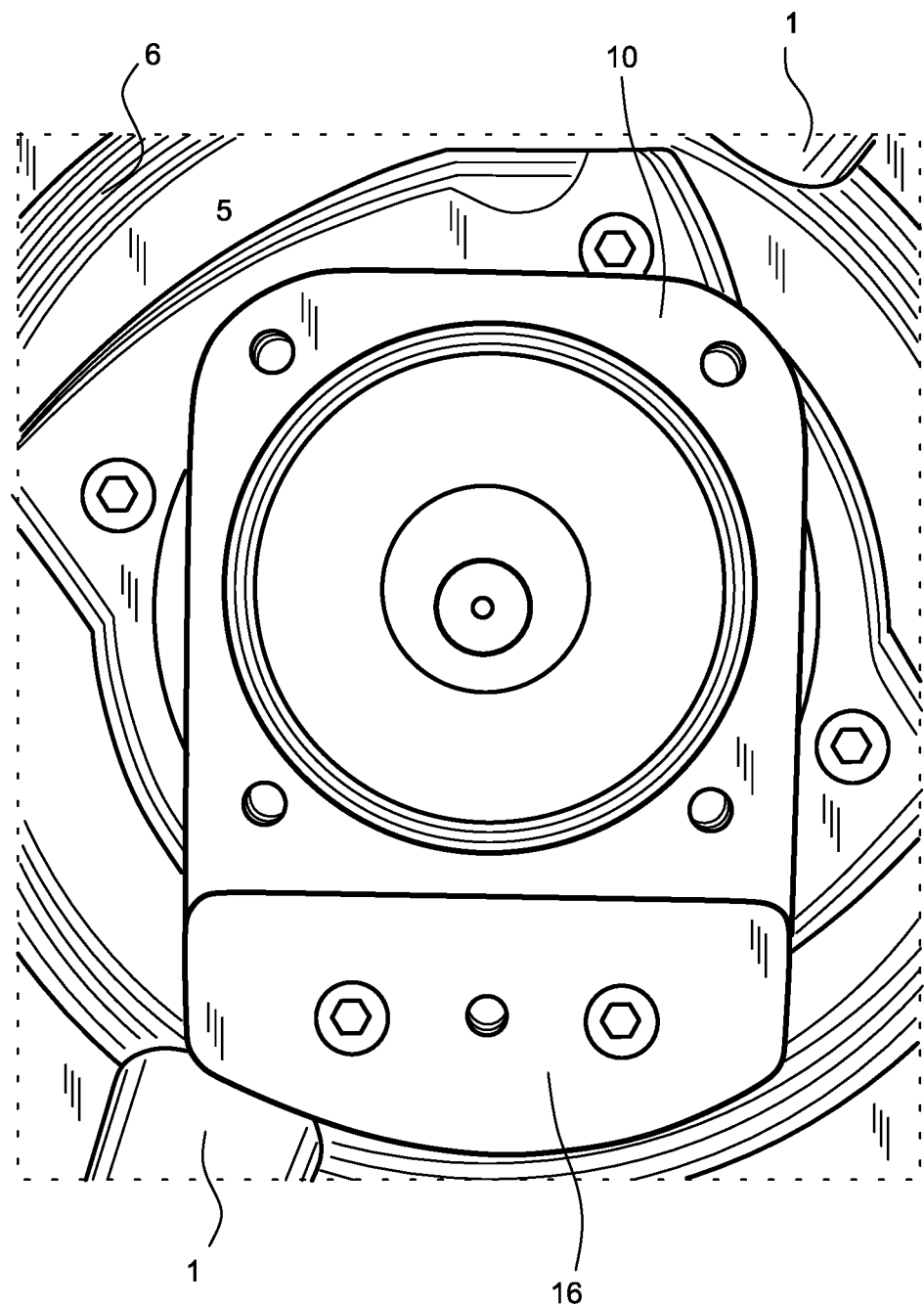
FIG. 8 illustrates the results of a running temperature test with a housing comprising two conduits.

FIG. 8 illustrates the placement of the temperature label in the test. The label depicted in FIG. 8 also bears the results of the test.

The experiment was conducted in accordance with what is described above for experiment 4 in the Experimental test 1.

The temperature label in FIG. 8 indicates that the test label was subjected to a temperature of at least 200° F. (93° C.), but not to a temperature reaching 210° F. (99° C.), suggesting an acceptable spindle bearing 3 temperature with two conduits 1. In visual terms, no spindle bearing grease was observed on the spindle bearing chamber wall 6 corroborating the acceptability of the spindle bearing 3 temperature during the experiment.

Prior to the experiment described above, a comparative baseline run was conducted using a similar setup but without any conduits 1. FIG. 7 depicts in visual terms the results this comparative baseline run, wherein ample spindle bearing grease was observed on the spindle bearing chamber wall 6 suggesting an unacceptably high temperature of the spindle bearing 3 during the run.

(End of Experimental Tests)

The disclosed solution is not limited to the examples and embodiments presented above as the inventive concept of the disclosed solution can be applied in other embodiments beyond those explicitly disclosed above. Thus, the examples and embodiments presented above should not be considered as limiting but they can be used in various combinations to provide desired results. More specifically, the disclosed solution is defined by the appended claims.

The invention claimed is:

1. An abrading apparatus suitable for abrading a workpiece with a rotating abrading member or members, the abrading apparatus comprising:
   a rotating shaft balancer adapted for balancing a rotating motion of the rotating abrading member or members, the shaft balancer comprising a protruding balancing element;
   a spindle attached to the shaft balancer via a spindle bearing, to which spindle, the rotating abrading member or members are releasably attached with a fixing or fixings;
   a housing adapted to prevent abrading debris from spreading to surrounding environment, which housing comprises as recessed spaces:
a spindle bearing chamber, which houses at least a part of the protruding balancing element or balancing elements of the shaft balancer, and which spindle bearing chamber, is defined by a spindle bearing chamber wall; and
at least one suction chamber defined by an inner suction chamber wall and an outer suction chamber wall, the at least one suction chamber adapted to controllably collect and extract abrading debris,
which housing has a clearance between the rotating abrading member or members and the housing,
wherein the housing comprises at least two conduits extending from the spindle bearing chamber wall to the inner suction chamber wall, the conduits being adapted for cooling the spindle bearing by conveying air between the spindle bearing chamber of the housing and the at least one suction chamber,
wherein at least one of the conduits constitutes a channel which is open towards the rotating abrading member or members.

2. The abrading apparatus according to claim 1, wherein the spindle bearing chamber is a circular recess at a center of the housing and the suction chamber is a toroidal recess at an outer periphery of the housing.

3. The abrading apparatus according to claim 1, wherein there are two or four conduits, such that, their openings are circumferentially equidistant from each other at the spindle bearing chamber wall and the inner suction chamber wall.

4. The abrading apparatus according to claim 1, wherein the suction chamber comprises at least one suction conduit adapted to be connected to suction pressure for extracting abrading debris from the suction chamber.

5. The abrading apparatus according to claim 1, wherein the conduits extend from the spindle bearing chamber wall to the inner suction chamber wall along a straight path.

6. The abrading apparatus according to claim 1, wherein the clearance between the housing and the rotating abrading members is less than 25 mm.

7. The abrading apparatus according to claim 1, wherein a smallest measured clearance between the protruding balancing element of the shaft balancer and the spindle bearing chamber wall is less than 25 mm.

8. The abrading apparatus according to claim 1, wherein the abrading apparatus is a random orbital sander.

9. The abrading apparatus according to claim 1, wherein the spindle bearing chamber houses at least a part of the spindle bearing and the spindle.

10. A method for cooling a spindle bearing of an abrading apparatus, the method comprising:
providing an abrading apparatus comprising:
a rotating shaft balancer adapted for balancing a rotating motion of a rotating abrading member or members, the shaft balancer comprising a protruding balancing element;
a spindle attached to the shaft balancer via a spindle bearing, to which spindle, the rotating abrading member or members are releasably attached with a fixing or fixings;
a housing adapted to prevent abrading debris from spreading to surrounding environment,
which housing comprises as recessed spaces;
a spindle bearing chamber, which houses at least a part of the protruding balancing element or balancing elements of the shaft balancer, and which spindle bearing chamber, is defined by a spindle bearing chamber wall; and
at least one suction chamber defined by an inner suction chamber wall and an outer suction chamber wall, the at least one suction chamber adapted to controllably collect and extract abrading debris,
which housing has a clearance between the rotating abrading member or members and the housing,
wherein the housing comprises at least two conduits extending from the spindle bearing chamber wall to the inner suction chamber wall, the conduits being adapted for cooling the spindle bearing by conveying air between the spindle bearing chamber of the housing and the at least one suction chamber,
wherein at least one of the conduits constitutes a channel which is open towards the rotating abrading member or members,
furthermore, the method comprising:
rotating the shaft balancer within the spindle bearing chamber of the housing, such that,
an overpressure is formed in front of a protruding balancing element of the rotating shaft balancer with respect to a rotational direction of the shaft balancer and
an underpressure is formed behind the protruding balancing element of the rotating shaft balancer with respect to the rotational direction of the shaft balancer;
conveying air heated by the spindle bearing from the spindle bearing chamber to a suction chamber as the overpressure in front of the protruding balancing element of the rotating shaft balancer is discharged from the spindle bearing chamber via a conduit into the suction chamber; and
conveying cool air from the suction chamber into the spindle bearing chamber as the underpressure behind the protruding balancing element of the rotating shaft balancer draws in air from the suction chamber via a conduit to the spindle bearing chamber.

11. The method according to claim 10, further comprising conveying air away from the suction chamber by way of suction pressure connected to the suction chamber.

12. The abrading apparatus according to claim 6, wherein the clearance between the housing and the rotating abrading members is less than 10 mm.

13. The abrading apparatus according to claim 12, wherein the clearance between the housing and the rotating abrading members is less than 5 mm.

14. The abrading apparatus according to claim 7, wherein a smallest measured clearance between the protruding balancing element of the shaft balancer and the spindle bearing chamber wall is less than 10 mm.

15. The abrading apparatus according to claim 14, wherein a smallest measured clearance between the protruding balancing element of the shaft balancer and the spindle bearing chamber wall is less than 5 mm.

* * * * *